(12) United States Patent
Purcell

(10) Patent No.: US 6,601,043 B1
(45) Date of Patent: *Jul. 29, 2003

(54) AUTOMATED AND INDEPENDENTLY ACCESSIBLE INVENTORY INFORMATION EXCHANGE SYSTEM

(76) Inventor: Daniel S. Purcell, 1801 Steeplechase Dr., Amarillo, TX (US) 79106-1928

( * ) Notice: Subject to any disclaimer, the term of this patent is extended or adjusted under 35 U.S.C. 154(b) by 128 days.

This patent is subject to a terminal disclaimer.

(21) Appl. No.: 09/603,012

(22) Filed: Jun. 26, 2000

Related U.S. Application Data (63) Continuation of application No. 09/227,723, filed on Jan. 8, 1999, now Pat. No. 6,081,789, which is a continuation of application No. 08/864,314, filed on May 28, 1997, now Pat. No. 5,940,807, which is a continuation of application No. PCT/US97/08750, filed on May 23, 1997.
(60) Provisional application No. 60/018,293, filed on May 24, 1996.

(51) Int. Cl.$^7$ ............................................. G07B 17/60
(52) U.S. Cl. ............................ 705/26; 705/27; 705/28; 707/7; 707/100; 707/104.1
(58) Field of Search ............................ 348/13; 705/26, 705/27, 28, 35; 707/7, 100, 101, 104

(56) References Cited

U.S. PATENT DOCUMENTS

| | | | |
|---|---|---|---|
| 4,799,156 A | | 1/1989 | Shavit et al. ................. 705/26 |
| 4,903,201 A | * | 2/1990 | Wagner ........................ 705/37 |
| 4,980,826 A | * | 12/1990 | Wagner ........................ 705/37 |
| 4,992,940 A | | 2/1991 | Dworkin ....................... 705/26 |
| 5,053,956 A | | 10/1991 | Donald et al. ............... 395/560 |
| 5,113,496 A | | 5/1992 | McCalley et al. ........... 395/200 |
| 5,168,446 A | * | 12/1992 | Wiseman ..................... 705/37 |
| 5,191,410 A | | 3/1993 | McCalley et al. ............ 348/13 |

(List continued on next page.)

FOREIGN PATENT DOCUMENTS

| EP | 1182597 A2 | * | 2/2002 |
|---|---|---|---|
| JP | 08-137913 | * | 5/1996 |

OTHER PUBLICATIONS

"Biz–2–Biz Q&A"; Adweek, Sep. 20, 2000, vol. 40, No. 38, p. 78.*

"Metiom and Wilmar Industries Make Full Line of Maintenance Supplies Available to E–Marketplace Customers"; Business Wire, Dec. 11, 2000.*

"*Electronic Intermediaries*"; american.edu/carmel/cb5426a/ electronic%20intermediaries.htm Oct. 1, 1997.

Eric Knorr; "Dawn of the Digital Marketplace," Business E–Commerce, pp. 125–137.

Primary Examiner—Edward Cosimano
(74) Attorney, Agent, or Firm—Baker Botts L.L.P.

(57) ABSTRACT

A method for exchanging information between providers and users of products and services in which an information management system is established that is computer based and has information processing and storage capabilities. The system also has electronic communication connections that permit buyers and sellers to electronically connect with the information management system for information exchange. Limited electronic access to the information management system is granted to approved sellers of products and services. After approval, each such seller is enabled to access inventory information of that seller for amendment purposes. Similarly, limited electronic access to the information management system is granted to approved buyers of products and services and are provided a searching-capability to search a compilation of a plurality of seller's inventory information using criteria specified by that approved buyer. Last, a buyer's listing of products and services is compiled from the compilation of the seller's inventory information for that buyer based on that buyer's search criteria and in which duplicate inventory items are removed therefrom.

25 Claims, 3 Drawing Sheets

U.S. PATENT DOCUMENTS

| | | | | |
|---|---|---|---|---|
| 5,195,092 A | | 3/1993 | Wilson et al. | 370/94.2 |
| 5,208,665 A | | 5/1993 | McCalley et al. | 358/86 |
| 5,297,031 A | * | 3/1994 | Gutterman et al. | 705/37 |
| 5,305,195 A | | 4/1994 | Murphy | 705/1 |
| 5,351,186 A | | 9/1994 | Bullock et al. | 705/1 |
| 5,361,199 A | | 11/1994 | Shoquist et al. | 705/26 |
| 5,402,336 A | | 3/1995 | Spiegelhoff et al. | 705/8 |
| 5,406,475 A | | 4/1995 | Kouchi et al. | 705/8 |
| 5,440,479 A | | 8/1995 | Hutton | 705/26 |
| 5,451,998 A | | 9/1995 | Hamrick | 348/13 |
| 5,485,370 A | | 1/1996 | Moss et al. | 395/200.47 |
| 5,630,125 A | | 5/1997 | Zellweger | 395/614 |
| 5,664,111 A | | 9/1997 | Nahan et al. | 705/27 |
| 5,664,115 A | | 9/1997 | Fraser | 705/37 |
| 5,727,164 A | | 3/1998 | Kaye et al. | 395/228 |
| 5,740,425 A | | 4/1998 | Povilus | 707/100 |
| 5,754,850 A | | 5/1998 | Janssen | 395/615 |
| 5,758,328 A | | 5/1998 | Giovannoli | 705/26 |
| 5,848,399 A | | 12/1998 | Burke | 705/27 |
| 5,884,309 A | | 3/1999 | Vanechanos, Jr. | 707/10 |
| 5,915,209 A | * | 6/1999 | Lawrence | 455/31.2 |
| 5,918,213 A | | 6/1999 | Bernard et al. | 705/26 |
| 5,940,807 A | * | 8/1999 | Purcell | 705/26 |
| 5,946,665 A | * | 8/1999 | Suzuki et al. | 705/26 |
| 5,963,916 A | | 10/1999 | Kaplan | 705/26 |
| 6,014,643 A | * | 1/2000 | Minton | 705/37 |
| 6,081,789 A | * | 6/2000 | Purcell | 705/37 |
| 6,119,101 A | | 9/2000 | Peckover | 705/26 |

* cited by examiner

AUTOMATED AND INDEPENDENTLY ACCESSIBLE INVENTORY INFORMATION EXCHANGE SYSTEM

RELATED PATENT APPLICATIONS

This patent application is a continuation of U.S. patent application Ser. No. 09/227,723 filed Jan. 8, 1999 entitled AUTOMATED AND INDEPENDENTLY ACCESSIBLE INVENTORY INFORMATION EXCHANGE SYSTEM (now U.S. Pat. No. 6,081,789) which is a continuation of application Ser. No. 08/864,314 filed May 28, 1997 also entitled AUTOMATED AND INDEPENDENTLY ACCESSIBLE INVENTORY INFORMATION EXCHANGE SYSTEM (now U.S. Pat. No. 5,940,807) which is a continuation of International Patent Application No. PCT/US97/08750 filed May 23, 1997, published under International Publication No. WO 97/44749 on Nov. 27, 1997 entitled AUTOMATED AND INDEPENDENTLY ACCESSIBLE INVENTORY INFORMATION EXCHANGE SYSTEM which claims the benefit of U.S. Provisional Application No. 60/018,293 filed May 24, 1996 and also entitled AUTOMATED AND INDEPENDENTLY ACCESSIBLE INVENTORY INFORMATION EXCHANGE SYSTEM; each of said applications in their entirety are hereby expressly incorporated by reference into the present application.

DESCRIPTION

TECHNICAL FIELD

This invention relates generally to apparatus and method for matching buyers and sellers of products and services. More particularly, it pertains to automated, and usually computerized methods and systems for creating a depository for sellers to indicate inventory availability and a source for buyers to access to review those seller's inventories for purchase purposes. Optionally, the system may be used by a single entity to manage assets where multiple users require the ability to independently access the management system, often times from remote and varying locations.

BACKGROUND ART

The cornerstone of a free trade stem is the ability of merchants to make the availability of their products and services known to potential purchasers. The concept of trading between sellers and buyers is well known and transactions between the two originally occurred in face-to-face meetings. Subsequently, as markets became more sophisticated, buyers and sellers turned to written documentation for both placing orders and filling orders. Of late, however, the advent of electronic transactional capabilities has made it exceedingly advantageous for businesses to automate many of their methods of doing business. Among those methods and processes is the activity of merchandising goods and services. A common goal in these automations is to increase accuracy, while at the same time reduce costs and time-frames between the initiation of a purchase and its completion.

A fundamental need of sellers of merchandise and providers of services is an effective means for communicating inventory availabilities to potential buyers. As evidenced by the thriving advertising industry, effective and persuasive means for communicating information to buyers is a paramount concern for providers. The advent of broadcast media provided a revolutionary step and improvement in the ability to disseminate information to purchasers. Broadcast communications, however, are unidirectional in that sellers are able to disseminate information to potential buyers, but those buyers who receive the information are not able to react in a direct manner and "broadcast" a response. Though radio and television has made it easier for a seller to distribute product and service information to a broader audience than traditional print media, it has not provided a highly effective means for selecting the receivers of the information, nor does it provide a closed environment within which the parties may review the needs and abilities of the other.

Because of the broadcast media's ability to disseminate information in a rather scattered manner to parties who may or may not have a need for the advertised product or service, consumers are regularly bombarded with information, from sellers that is of no interest, and in many cases serves only to irritate. As a result, a majority of the resources expended on broadcast advertising are wasted on the distribution of information that is never likely to achieve a sale.

As opposed to advertising to consumers, marketing between businesses is often more successful at affecting a sale. The reason for this is that more focused communication is possible when a supplier knows with some degree of certainty who its potential customers are. In that case, information may be provided to those who are at least likely to purchase goods and services of the seller.

Some sellers choose systems in which information about their merchandise is made available to potential purchasers, but it is the purchaser that originates a transaction by accessing the information and initiating a purchase. In this type of system, there is almost a 100% percent certainty that the potential purchaser at least has a need for the product, and because they are actively seeking to review available products and services that will meet their needs, they are also likely to affect and complete a purchase. The problem of such a system is providing an environment within which the providers information is conveniently deposited and held until selectively accessed by interested buyers. In a more traditional format, catalogs of merchandise available from a provider have been printed and which may in turn be requested by buyers interested in those types of products. Without some advertising of the availability of these catalogs, however, it is unlikely that many purchasers will either know about the catalog's availability, or how to order and receive one.

The catalog concept has been automated in U.S. Pat. No. 5,053,956 that discloses an interactive system for retail transactions. In use, a purchaser may access a computer system and select information about a particular product that is then displayed on a video screen, together with certain data and specification about the product. In this invention, a transaction may be affected and a purchase made through the displaying computer system.

A related system is disclosed in U.S. Pat. No. 5,402,336 that discloses a system and method for allocating resources of a retailer among multiple wholesalers. This system provides a means by which information may be provided about a plurality of wholesalers and their inventories and purchases made by retailers based on those retailers' collective needs.

In each of the described patented systems, the purchaser has the ability to access information in an automated environment and review merchandise information. Orders may even be placed on these systems once the purchaser has made an appropriate selection. In each situation, however, the merchandise provider has no interactive capabilities for accessing the systems. Instead, the sellers are dependant upon information about their products and services being entered and made available by the system administrator.

An alternative system for exchanging information has been described in U.S. Pat. No. 4,799,156 that discloses an interactive market management system. Therein, a system is described for interactive on-line electronic communications and processing of business transactions between a plurality of different types of independent users including at least a plurality of sellers and a plurality of buyers, as well as financial institutions and freight service providers. The concept is to provide each member participating in a transaction simultaneous on-line communication with the other members. The environment for the communication is a computer system, but the interaction is akin to a conference call or "chat line" wherein each member communicates with the others and is ultimately able to make commitments for their contributions to the transaction on the system. While certain benefits may be achieved by such an interactive system, there are many times when all parties are not available at the same time to interact with one another. As a result, utilization of a system of this nature will be limited to those times at which all parties are simultaneously available to correspond with each other. The ability to fully utilize a system of this nature is obviously hindered by this requirement that all parties be available at the same time. Furthermore, it has the limitation of being able to be utilized for only a single transaction at any one time. That is, multiple purchasers cannot converse with the seller about separate and different transactions at the same time.

In reviewing the above needs of purchasers and sellers, as well as the known systems that are presently available for their transactions, the need for an improved means for exchanging product and service information between parties has been recognized and resolved through the use of the present invention.

DISCLOSURE OF THE INVENTION

The present invention in its several disclosed embodiments alleviates the drawbacks described above with respect to conventionally designed methods and incorporates several additionally beneficial features.

This invention includes features and/or components that have been invented and selected for their individual and combined benefits and superior performance as an automated and independently accessible inventory information exchange system. The system includes multiple aspects that individually and collectively provide new and novel features in and of themselves. Each of the individual components or processes, however, work in association with, and are optimally mated to the others. Together, they yield an overall information management system that has superior collective effectiveness in providing an automated and independently accessible inventory information exchange system.

Referring now to specific embodiments of the information management system of the automated and independently accessible inventory information exchange system of the present invention, additional benefits and advantageous features will be appreciated. The following optional and alternative embodiments of the present invention are provided as exemplifications to aid in the understanding of the invention, but are not to be considered necessarily limitations on the scope of protection claimed herein regarding the method for controlling the collection, processing and dissemination of information by a host regarding product and service availability.

In these regards, the method includes the steps of establishing a host operated information management system wherein the information management system is a computer having information processing and storage capabilities. The host also has electronic communication connections such as modems that permit third parties to electronically connect with the information management system for exchanging information therewith. Host approved sellers of products and services are granted limited electronic access to the information management system so that each approved seller then has a self-initiated capability to exclusively access that seller's inventory information that is maintained on the information management system for adding, amending and deleting portions of the seller's inventory information. The seller's inventory information is analyzed and assimilated into a buyers listing of products and services available through the information management system to potential buyers. Host approved buyers of products and services are granted limited electronic access to the information management system so that each approved buyer has a self-initiatable capability to access the buyers listing for reviewing products and services of interest to that buyer. Within the information management system, the capability is provided for a purchase transaction to be initiated by an approved buyer who electronically designates a product or service of interest for purchase from the buyers listing.

In one embodiment, a seller is assessed a service charge determined by the amount of inventory information stored on the seller's behalf in the host information management system. In another embodiment, the seller is assessed a transactional service charge, the amount of that service charge being determined by the sale price of the item sold in a sale transaction completed on the host information management system. In yet another embodiment, the seller is assessed a uniform transactional service charge per sale transaction completed on the host information management system.

Each approved buyer's capability to access the buyers listing for reviewing products further comprises the capability to filter the buyers listing so that only products or services meeting that buyer's specified criteria are listed for review. To aid in assuring that buyers may select only available products and services, the host system may alter the status of a selected item upon its designation by a buyer for purchase so that the item is subsequently removed from display on the buyers listing. Alternatively, the selected item designated by a buyer for purchase may be blocked from future selection by that or other buyers until the item's previous "available" status is restored.

Each seller and each buyer is issued a unique identifier utilized by the host information management system to identify each upon their log in into the host information management system. This log in identifier, such as a company identification number and/or password will be recognized and recorded by the host information management system for usage tracking, billing, and other purposes.

In a preferred embodiment, the host operated information management system is interfaced to the sellers and the buyers as a site accessible through the Internet. Easy access is provided to the host Internet site to the sellers and buyers, each of whom may access the host site upon their own initiative remotely through an Internet access provider of their choice. Because this preferred embodiment operates within the framework of the Internet, the system is substantially continuously available to a plurality of sellers and a plurality of buyers, except during very brief times during which system maintenance is performed.

The host information management system operates in a database format in which information pertaining to a particular product or service item is maintained as one of a plurality of records of the database and the buyers listing is produced through a report that surveys the plurality of records and compiles the buyers listing from selected information contained within those records. When input, each record is assigned a unique identifier for tracking and processing purposes. Since each record usually reflects a discrete item of product or a particular service, the record identifier, such as an identification number, also serves to identify individual products or services among the possibly many that are maintained not only by a particular seller, but also among the several sellers' inventories.

Each record is formatted to a base template that has a plurality of fields wherein each field is intended to contain a specific type of information about the product or service item of that record. Because each seller is identified upon log in into the host system, a customized template may be created for each seller wherein each field that is likely to contain the same information for each product or service record of that seller is partially pre-completed to facilitate the entry of product and service information into the host information management system by the seller. Therefore, instead of displaying a generic template to a seller when his or her inventories are being manipulated to add, change or delete items, their customized template may be displayed for making the manipulation process go more quickly and with less effort.

This same or abbreviated version of the template may be displayed to a buyer upon log in. That buyer may then complete chosen fields with information to be used in a matching process with like fields in the sellers' inventory records for filtering product and service information to be listed on the buyers listing to that information which meets the buyer's specified filter criteria. As an option to the buyer, the buyer's filtered product and service information to be listed on the buyers listing may be further condensed so that multiple items of like or similar products and services meeting certain host or buyer specified criteria are reduced to single entries on that buyer's listing for brevity and simplification purposes to the reviewing buyer.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For purposes of this invention, a person of ordinary skill in the art is considered to be one versed in the utilization of personal computers, programs employed on personal computers, and accessing and utilizing the network commonly referred to as the Internet or World Wide Webb.

Figure 1:
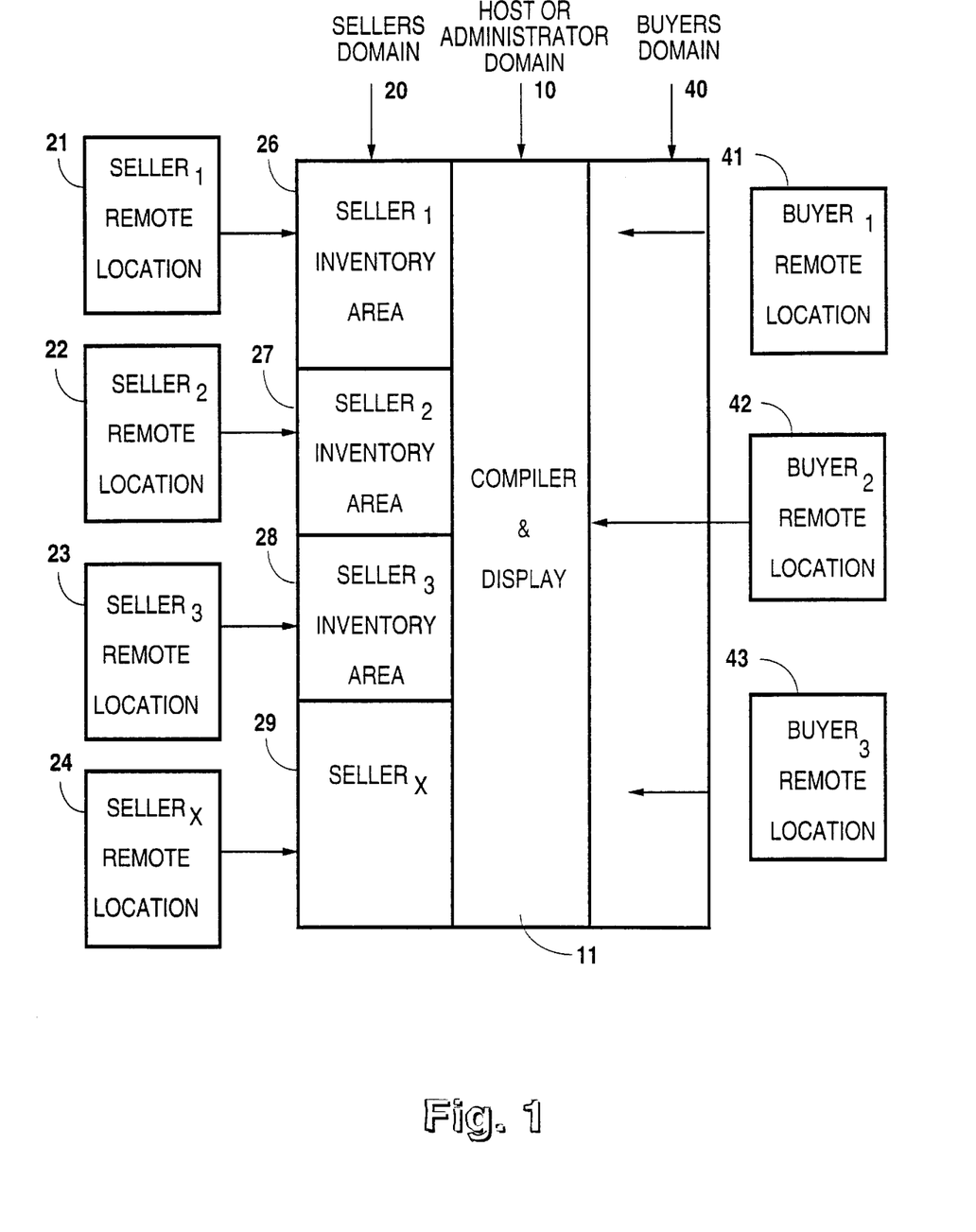
FIG. 1 is a schematic representation of the inventory information exchange system.
Figure 2:
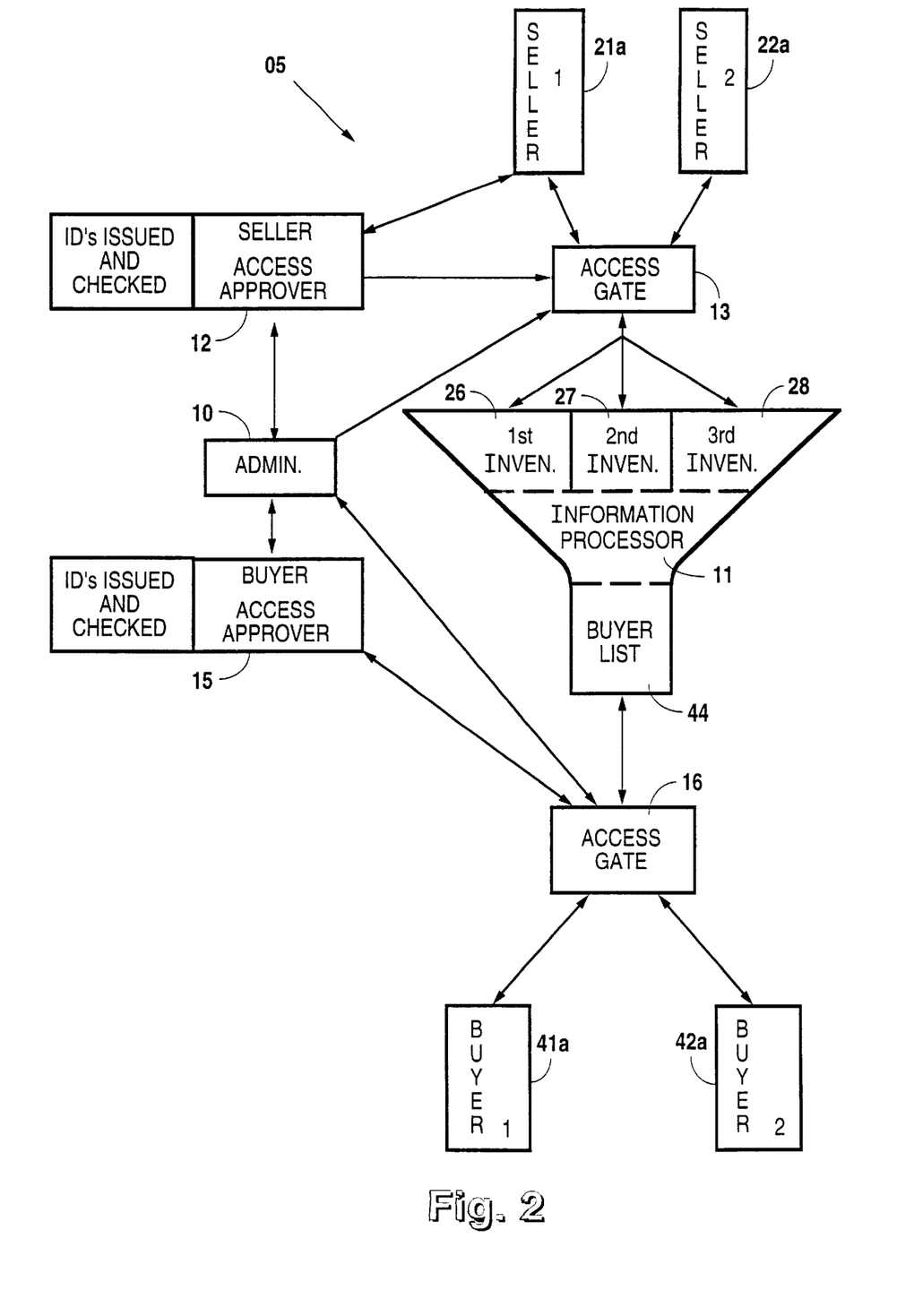
FIG. 2 is a flowcharted representation of the method of utilizing the automated and independently accessible inventory information exchange system of the present invention as employed by a plurality of buyers and sellers in an Internet environment.
Figure 3:
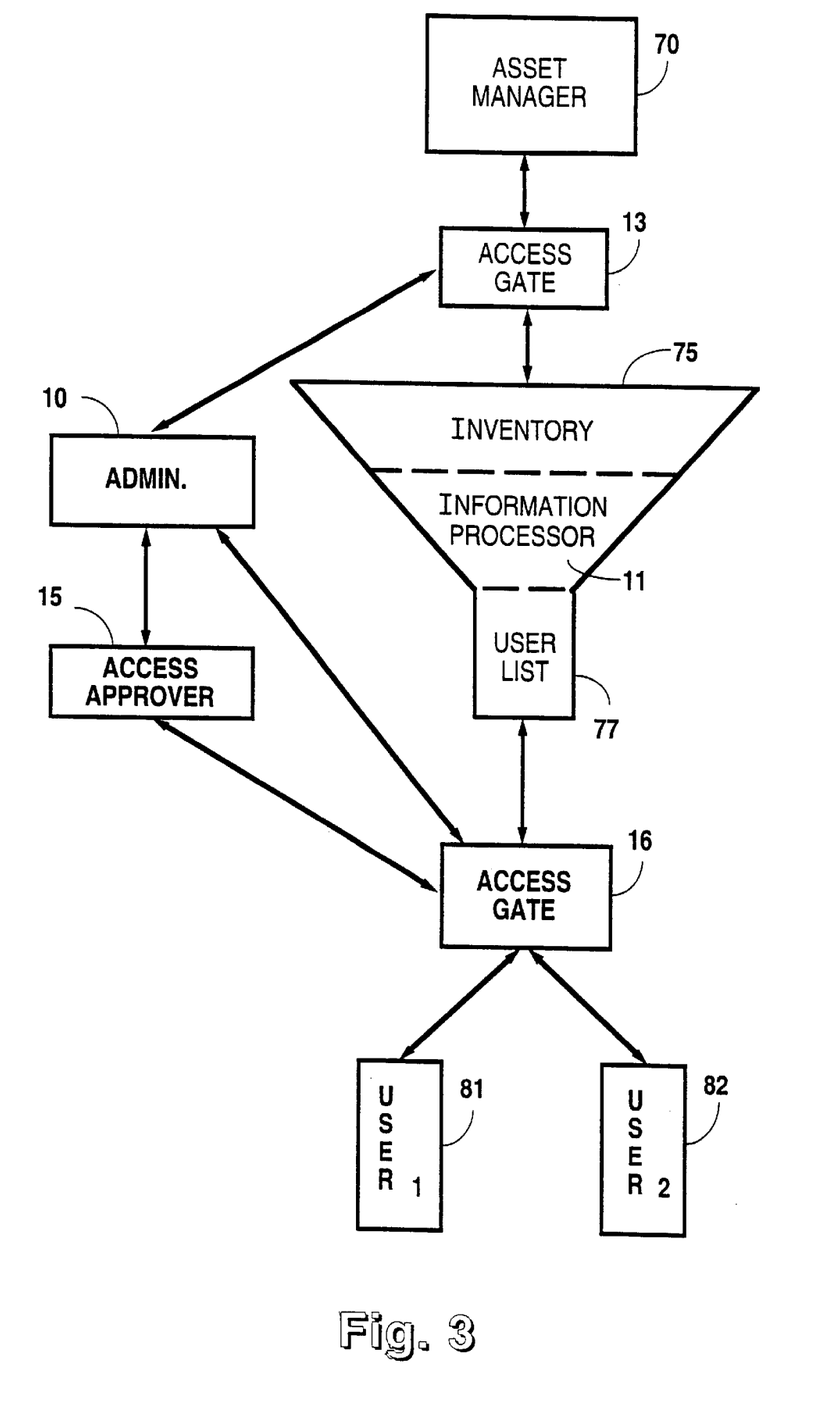
FIG. 3 is a flowcharted representation of the method of utilizing the automated and independently accessible inventory information exchange system of the present invention as employed by an entity for asset management purposes wherein a plurality of users access the system via the Internet.

The present invention provides a means by which product and service information may be made available to select buyers or users and as illustrated in FIGS. 1–3. The basic concept of the present invention is to provide a data base to which sellers and buyers have limited, but independent access for exchanging sales information. Each seller has the ability to access information about his or her own inventory on the system. It is contemplated that multiple sellers will have inventory information on the system in "areas" that contain their information alone. Each of those several sellers will only have access to their own inventory information, and not the information of the other sellers.

From each of those sellers' areas, information will be retrieved, processed and manipulated into a buyer's display to which a plurality of buyers have access for reviewing up-to-date information about the several sellers' merchandise and/or services. In this embodiment of the system, there is no direct nor simultaneous communication between the sellers and buyers. Instead, the system is effectively divided into a sellers' domain and a buyers' domain that are interfaced by an administrative operating system. The operating system may be used as a filter of the several sellers' inventories for compiling a listing of total available merchandise for the member purchasers. Optionally, direct communication may be facilitated between a buyer and seller by accommodating the delivery of messages or if both are simultaneously logged into the system, each may be electronically interconnected. For obvious reasons, this type of direct communication will not be made available to users in all situations, thereby preserving the host's control over the exchanges enjoyed by the subscribing users on the information management system.

In one embodiment of the invention, purchasers may place an order with the host or administrator of the system who later conveys the information to an appropriate seller. Alternatively, the purchaser may place an order directly with a specific seller based on either product criteria or seller's identification, if that is made available. In any event, both sellers and purchasers may access their sides of the system at any time; sellers may manipulate and change their inventory information and buyers may review an updated product listing that is maintained and updated on a substantially continuous basis.

It is contemplated that the present invention may be maintained within any one of several available environments that allows limited user accessibility as well as processing capabilities for manipulating the information to be exchanged. Because of the compiling and assimilating features required of the administrative system, it is incumbent that the hosting system be computerized and that the sellers and buyers have a means by which they can independently gain access on their own initiative. A dedicated computer base or system having dial-up and on-line capabilities would satisfy these requirements, as would the more elaborate, but exceedingly popular Internet. Within each of these computerized systems, it is possible to partition off special areas for each sellers inventory information, and to which a particular seller has exclusive access.

The information provided within each seller's inventory area is formatted and input in such a way that the administrative portion of the system can retrieve that information and analyze and compile it with information about the inventories of other sellers. The information from the several sellers' areas is either continuously monitored or intermittently examined on a regular, but frequent basis to extract relevant changes about the several available inventories. The withdrawn information is then compiled to present a uniform product listing that may include a listing of each product of each seller, or alternatively the listing may be filtered to show a unified listing of products wherein each product has a single entry regardless of the number of sellers having that particular product for sale. This listing is typically not directly accessible by the sellers. In at least one embodiment, a seller will have to also be authorized as a buyer to gain access to the compiled listing.

On the opposite side of the administrative system from the sellers' domain is the merchandise display domain for subscribing buyers desiring to review the information compiled from the several sellers' data bases. In at least one embodiment, the buyer will be able to communicate with the host and specify criteria for the display listing that will limit the displayed listing to only those products and/or services of immediate interest. In this way a greater array of products may be maintained on any given system without causing confusion or becoming burdensome since the buyers can filter what is displayed at any one time on their own.

The buyers will typically view the administrator of the system as a sole provider of the listed products and services, and not a representative of the plurality of sellers. In this way, the host acts as a clearing house through which information is collected from sellers and then displayed for buyers who can then place orders through the system. The administrator may then order appropriate product and service corresponding to the buyers' requirements. In an alternative embodiment, it is anticipated that the buyers may place orders directly with the sellers and that the host receives a commission or fee for providing the information exchange service.

The system and process of the present invention may be differentiated from others presently known by its ability to serve as an administrator or host that coordinates between a sellers' domain and a buyers' domain with the interface therebetween being a site having an analyzed display of products and services available upon the system. By having the intermediary administrator, the necessity of providing interactive and simultaneous communication between the buyer and seller is eliminated. It does, however, provide continuous access to the system for both buyers and sellers. The system permits the buyer to order product and service through the administrator at any time, just as it permits sellers to access and amend their inventory information. Among the benefits of this system is that neither party on either side of the administrator need be logged into the system at the same time. This benefits all users in that the schedule of each may be accommodated and business can be transacted across multiple time zones from any point across the globe having connective capabilities. It further benefits the sellers in that exposure is provided to customers who have a defined need for the sellers' products and who are seeking at least information of the nature maintained on the system. From the buyers perspective, the exchange system eliminates the need to solicit information from multiple providers and permits them to review analyzed and organized information about relevant products of interest.

It is anticipated that this system may be provided on any electronic medium capable of providing a means for limiting access to a plurality of authorized users. It is contemplated that an appropriate host system may be a dedicated computer having dial-up and on-line capabilities, as well as computational capabilities. In a preferred embodiment, however, the system is administered in an Internet environment wherein a host site serves as the administrator and both buyers and sellers are permitted access to the site based on authorized access codes. Information for transacting actual purchases may be exchanged outside of this system in a more traditional manner of placing an order by either telephone, telecopy, or mail service from the sellers to the administrator. It is anticipated, however, that the host site will accommodate direct orders on-line by the purchaser.

From a hardware standpoint, it is well known in the art today to provide personal computer (PC) access to either a dial-up system or a web site by multiple users either simultaneously or at different times. Therefore, the users of the present invention are required only to have computing capabilities on site that permit electronic access to the host administrator at the initiative of that user. The host, either a dedicated computer system, Webb site or other hosting environment will be "open" at all times and available to receive log-ins from a plurality of users, be they buyers and/or sellers, at different times, or simultaneously. In either of the systems appropriate for creating such an environment, the users will be able to effectively leave messages that are to be communicated either directly or indirectly to the users on the opposite side of the host for affecting a commercial transaction. The administrator of the product listing will have capabilities for reviewing and analyzing the sellers' information utilizing an information processor 11 such as a computer's CPU on a continuous basis so that the listing is always up-to-date, or at sufficiently frequent intervals that the likelihood of a buyer purchasing a product based on specifications that have been changed since the last update is minimized.

A substantially identical information exchange system as described herein above may be utilized by a single entity for the purpose of managing certain asset and service availabilities within a particular organization or "domain". A system used by such an organization may be run on an identical platform to that described herein above, or there may be greater leniencies between the divisions for what has previously been described as sellers and buyers domains.

As an example, an asset manager responsible for tracking and inventorying a company's assets will be similarly positioned to a seller. That assets manager may wish to have information about its inventories displayed to others within the organization, but to also prevent them from making unauthorized changes to the item inventories. Alternatively, the system of controls may be more relaxed wherein those who survey the inventories from a position similar to a buyer may be provided the ability to manipulate inventory entries based on that reviewing user's needs and actions taken relative to listed items. The basic framework of the information exchange system, however, need not vary greatly from the buyers and sellers format.

EXAMPLE OF A MULTI-SELLER/MULTI-BUYER UTILIZATION

An example of an information exchange system 05 according to the present invention intended to be utilized by a plurality of sellers 21a, 22a and buyers 41a, 42a may be seen through the following example of a domain within which oil field products and services are exchangeable. Initially, a host information management system 10 is established within a computer system that manages and processes all the information entered and stored within the system, and controls the access granted to both buyers and sellers.

It is anticipated that a database format and framework well known within the computer industries will be utilized as the present invention's primary platform or driver for the system. As with all databases, each domain will be customized to the needs and requirements of the buyers and sellers expected to utilize the same.

Once the system for managing the information is established, access must be facilitated to both sellers and buyers. As previously described, the host and manager of this system will normally want only those entities who are approved subscribers to have access. Therefore, an initial step of both sellers and buyers is to solicit authorization for admission into the system from the host administrator or access approvers 12, 15. In an Internet environment, this authorization will be sought electronically by accessing the website or access gates 13, 16 that act as an interface between the information management system and the outside world. After a buyer or seller is approved for access, they will be issued an identifier such as an identification number or name for use when seeking access to the management system through the website. As a further security measure and as is common to many access-upon-request systems, a complimentary password will also be issued that doubly insures that those parties accessing the information exchange system have been previously authorized by the host.

After a seller has been initially approved for access, he or she will communicate basic information that is common to the products and services he or she expects to be listed in the system. Based upon the nature of the domain 20 or forum to which that seller is granted access, a template record will be created by the administrator to be used when the seller's itemized inventory information 26, 27, 28, 29 is entered into the system. This "standard" information for a particular seller's products will be amendably inserted into a seller's sample template that will be available upon log in and which is partially pre-completed with that standard information. This pre-completion facilities entry of individual items and speeds the input process.

As in many database templates, each record will comprise a plurality of fields, each field representing a specific type of information relevant to each piece of equipment or service. Using the oil field products and services industry as an example, casing pipe of various sizes, wall thicknesses, and thread specifications may be usual products exchanged. Therefore, each of these three characteristics may be provided a field wherein the specifics about an item being entered are described. For uniformity, when a limited number of possibilities is appropriate for a field entry, those possibilities may be made displayable in "drop-down" menus common to databases. Once the sellers' information has been input, it is the host system's purpose to make it available in suitable format to potential buyers of the products and services.

Once a buyer has been authorized and permitted access to a buyers domain 40 of the exchange system, a similarly customized template will optionally be provided. The template, however, is used by the buyer for making selection criteria entries. A partially completed template may be displayed to a buyer upon his or her log in that has certain pre-filled fields designated by the individual buyer when he or she subscribes to the system. An example would be a subscribing buyer who only supplies casing pipe for the drilling of oil wells. In that instance, the buyer would desire to have pre-filled fields that automatically specify his search criteria to be limited to tubing casing. If there are predominate features that are more often than not required by a buyer, those indications may also be pre-filled. Generally, anything that can be pre-filled and not repetitively typed will be desirable to a buyer.

Once the buyer logs into the information exchange system he or she is recognized by the host based on the entered identifier and a pre-filled selection criteria template is made available for further customization before a search of the sellers' inventories is executed by the database. It is also possible that the format for display of the buyer's listing may be customized for a particular buyer based on his or her recurring needs. For instance, all casing pipe may be considered to be fungible, therefore it is not necessary for the buyer to know how many different sellers such pipe available.

After the buyer listing 44 indicating product and service availability meeting the buyer's specified criteria is displayed, the buyer reviews the same and makes decisions based thereon. It may be that a purchase decision is made and the transaction is initiated within the host system. Based upon the degree of control retained by the host over such sale transactions, the two parties may be permitted to deal directly through the host system. Alternatively, the host may remain an intermediary who conveys messages. In each case, the transaction may be electronically processed through the several physical connections established between the buyer and seller by way of the interface of the host system. Transaction that are controlled by the host may be tracked, administered, and charged for. It is possible that the host will charge transactional service fees that are unit based per transaction or proportionally based on such things as selling price and quantities. Alternatively, a seller may be assessed a fee based upon the amount of inventory maintained on the host's system. This type of pricing, however, will be more suitable to asset management systems, a use which is detailed herein below.

In practice, the present invention provides significant benefits to both sellers and buyers in that access may be achieved from any remote location 21, 22, 23, 24, 41, 42, 43 at which the buyer or seller can make suitable connections to the Internet. Most often, this will be accomplished through the buyers or sellers regular Internet access provider. This, however, is not a limitation in that the website of the host is "blind" to the avenue through which access is sought, other than that such access comes through the expected Internet network to the host site.

The particulars under which the information exchange system is administered will be controlled by the host though appropriate programming. It is anticipated that exemplary exchange systems described herein may be altered in any number of ways to better facilitate exchanges between different parties for relevant product and service classifications which have been designated herein as domains.

EXAMPLE OF AN ASSET MANAGEMENT UTILIZATION

As described herein above and illustrated in FIG. 3, an asset manager 70 may desire to out-source substantially all overhead associated with in-house information management facilities. The above described system provides a superior solution for such a manager with very little amendment to the procedures and programming described in the example immediately above. In the instance of a large corporation, there may be widely spread and remote locations from which users 81, 82 need to review available inventories 75 of assets and services displayed in user listings 77 within their particular organization. Because it is anticipated that the specific domain will be accessed by users within the same organizations, the partitions otherwise provider between buyers and sellers may be relaxed. At the same time, however, they may be desirably maintained so that strict controls are made available to the asset manager. Like the example above regarding oil field products and services, a world wide oilfield service company may have similar needs to a market wherein a plurality of sellers and buyers operate. In such a case, the administrator or manager of the assets will act as a unified "seller" of product and service available within the organization and users throughout the company will act as "buyers" who can review assets currently owned by the company before going outside the company to purchase items.

The benefits of using such systems are obvious. Not only does it stop the overhead charges to the asset administrator by removing the need for physical computer space and capabilities, but it also out-sources programming personnel who would otherwise be required to maintain an in-house system. Still further, the superior exchange of information that will be experienced within the organization will be reflected in lower costs and better utilization of assets. As mentioned herein above, the host provider of the information exchange system will most likely charge a user fee that may not be transactionally based, but more closely associated with the volume of inventory maintained in the management system.

Each of these embodiments of the present invention are viewed as information exchange systems that may be suited for any product or service wherein information is desired in an easy to comprehend format by either (1) asset managers and users of the inventoried properties or (2) a plurality of purchasers and a plurality of sellers who desire access to a focused marketing medium for the products and services in which each is interested. Based upon the descriptions contained herein, the limits upon the information management system and its applications are viewed as being almost without bound and capable of providing great benefit to all participating users.

Information management systems in the form of automated and independently accessible inventory information exchange systems and their methods of use have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds utility in businesses and industries requiring the controlled exchange of inventory information. These inventories may include both products and services with the management of the same being accomplished in any processing environment, but particularly in computer settings. In a preferred embodiment, the system operates on what is generally known as the Internet providing remote and continuous access to a plurality of persons desiring to sell products or services and others who desire to buy the same. In an alternative embodiment, the present invention finds utility in an organization wherein that organization's complexity requires sophisticated information management systems for controlling inventories within the bound of that organization.

What is claimed and desired to be secured by Letters Patent is as follows:

1. A method for exchanging information between owners and potential purchasers of assets, said method comprising the following steps:

establishing an information management system, said information management system being Internet based and having information processing and storage capabilities and electronic access that permits potential purchasers to electronically access said information management system for reviewing available assets listed in said information management system;

granting electronic access to said information management system to potential purchasers of assets and providing a searching capability to such potential purchasers for searching an available asset listing using criteria specified by the potential purchaser; and compiling a purchaser's listing of assets from said asset listing for said potential purchaser based on the potential purchaser's search criteria.

2. A method for facilitating electronic commerce, comprising:

providing an information management system, the information management system being coupled to the Internet and having information processing and storage capabilities;

granting electronic access to the information management system to one or more buyers via the Internet;

providing a searching capability that allows a buyer to search seller inventory information using search criteria specified by the buyer, the seller inventory information provided by one or more sellers and including information associated with one or more products or services offered by each seller;

compiling a listing of products or services based on search criteria provided by a buyer; and condensing the compiled listing so that identical or similar products or services are listed as single entries in the listing.

3. The method of claim 2, further comprising preventing a buyer from electronically accessing the information management system to search the seller inventory information prior to authorization of the buyer as an approved buyer.

4. The method of claim 2, wherein condensing the compiled listing comprises condensing the listing such that each product included in the complied listing has a single associated entry in the listing regardless of the number of sellers providing inventory information associated with that product.

5. The method of claim 2, further comprising:

allowing a buyer to provide one or more pre-selected search criteria to be associated with the buyer; and filtering a listing compiled based on search criteria provided by the buyer such that only products or services meeting the buyer's pre-selected search criteria are included in the listing.

6. The method of claim 2, further comprising:

storing the seller inventory information provided by the one or more sellers at the information management system; and assessing a service charge to a particular seller based on the amount of seller inventory information associated with that seller that is stored at the information management system.

7. The method of claim 2, further comprising:

storing the seller inventory information such that inventory information pertaining to a particular product or service is maintained as one of a plurality of records of a database; and compiling the listing by searching the plurality of records and returning selected information contained within the records.

8. The method of claim 7, further comprising formatting each record based on a template, the template having a plurality of fields wherein each field is intended to contain a specific type of information relating to the particular product or service associated with that record.

9. The method of claim 2, further comprising providing the capability for a buyer to initiate the purchase of a product or service in the listing using the information management system.

10. The method of claim 9, further comprising assessing a transactional service charge to a particular seller in association with the purchase of a product or service of that seller by a buyer, the amount of the transactional service charge being determined by a sales price of the product or service.

11. The method of claim 9, further comprising assessing a uniform transactional service charge to a seller for each purchase of a product or service of that seller by a buyer.

12. The method of claim 9, further comprising altering the status of a particular product or service designated by a buyer for purchase so that the product or service is subsequently removed from availability in the seller inventory information.

13. The method of claim 9, further comprising altering the status of a particular product or service designated by a buyer for purchase so that the product or service is subsequently blocked from future selection by other buyers for purchase.

14. Software for facilitating electronic commerce, the software embodied on a computer-readable medium and, when executed by a computer, operable to:

provide a searching capability that allows one or more buyers to search seller inventory information using search criteria specified by the buyer, the seller inventory information provided by one or more sellers and including information associated with one or more products or services offered by each seller;

compile a listing of products or services based on search criteria provided by a buyer; and condense the compiled listing so that identical or similar products or services are listed as single entries in the listing.

15. The software of claim 14, further operable to authorize a buyer as an approved buyer before provide a searching capability to the buyer.

16. The software of claim 14, wherein condensing the compiled listing comprises condensing the listing such that each product included in the complied listing has a single associated entry in the listing regardless of the number of sellers providing inventory information associated with that product.

17. The software of claim 14, further operable to:

allow a buyer to provide one or more pre-selected search criteria to be associated with the buyer; and filter a listing compiled based on search criteria provided by the buyer such that only products or services meeting the buyer's pre-selected search criteria are included in the listing.

18. The software of claim 14, further operable to assess a service charge to a particular seller based on the amount of seller inventory information associated with that seller.

19. The software of claim 14, further operable to:

store the seller inventory information such that inventory information pertaining to a particular product or service is maintained as one of a plurality of records of a database; and compile the listing by searching the plurality of records and returning selected information contained within the records.

20. The software of claim 19, further operable to format each record based on a template, the template having a plurality of fields wherein each field is intended to contain a specific type of information relating to the particular product or service associated with that record.

21. The software of claim 14, further operable to allow a buyer to initiate the purchase of a product or service in the listing.

22. The software of claim 21, further operable to assess a transactional service charge to a particular seller in association with the purchase of a product or service of that seller by a buyer, the amount of the transactional service charge being determined by a sales price of the product or service.

23. The software of claim 21, further operable to assess a uniform transactional service charge to a seller for each purchase of a product or service of that seller by a buyer.

24. The software of claim 21, further operable to alter the status of a particular product or service designated by a buyer for purchase so that the product or service is subsequently removed from availability in the seller inventory information.

25. The software of claim 21, further operable to alter the status of a particular product or service designated by a buyer for purchase so that the product or service is subsequently blocked from future selection by other buyers for purchase.

* * * * *